Sept. 27, 1960     H. MEYER     2,953,930
CHAIN DRIVING MECHANISM
Filed May 24, 1957
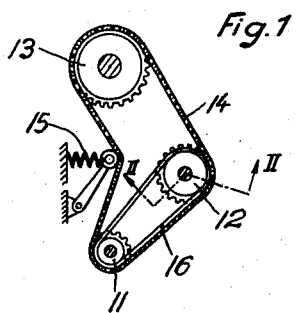
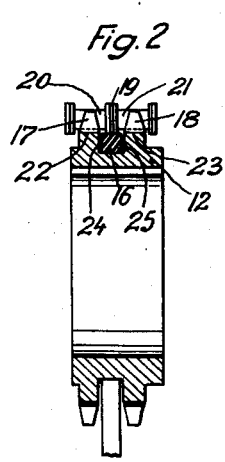
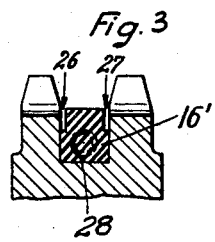
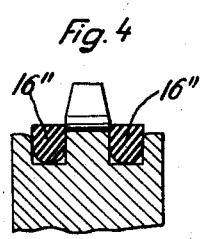
Inventor
HANS MEYER
BY Dike and Craig
ATTORNEYS.

United States Patent Office 2,953,930
Patented Sept. 27, 1960

2,953,930
CHAIN DRIVING MECHANISM

Hans Meyer, Stuttgart, Germany, assignor to Daimler-Benz Aktiengesellschaft, Stuttgart-Unterturkheim, Germany Filed May 24, 1957, Ser. No. 661,525

Claims priority, application Germany May 24, 1956

12 Claims. (Cl. 74—216.5)

My invention relates to a chain driving mechanism comprising an endless chain engaging two or more sprockets.

It is the object of the present invention to provide this mechanism with means for dampening the noise produced incidentally to the engagement of the links of the chain with the peripheries of the sprockets and, more specifically, it is an object of my invention to equip the driving mechanism with noise-absorbing means of the character indicated which may be easily applied to the sprockets and is not subject to excessive wear.

It has been proposed heretofore to provide each sprocket with a peripheral groove accommodating a strip of resilient material, such strip constituting a seat for the links of the chain and preventing the rollers mounted on the pivot pins of the links from contacting the tooth gap bottoms of the sprockets. Moreover, the resilient strip will tauten the chain automatically. This prior arrangement involves the disadvantage that the resilient strip is subject to considerable wear because the links of the chain will always hammer continually upon the same portions of the strip, thereby gradually indenting same.

Also, it is difficult to mount the strip in the groove particularly where the sprocket is provided with two peripheral rows of teeth flanking the groove. All of these disadvantages of the prior art arrangement are avoided by my novel chain driving mechanism in which an endless cord of noise-absorbing material engages at least two of the sprockets and is interposed between the peripheries of the latter and the links of the chain constituting seats for such links.

In the accompanying drawing I have illustrated a number of preferred embodiments of my invention. I wish it to be clearly understood, however, that my invention is in no way restricted to the details of such embodiments but is capable of numerous modifications within the scope of the appended claims. Moreover, I wish it to be understood that the terms and phrases used in the detailed description following hereinafter have been chosen for the purpose of illustration rather than that of restriction or limitation.

In the drawings:

Fig. 1 is a side view of my improved chain driving mechanism including three sprockets of different diameters, Fig. 2 is a section of one of the sprockets taken substantially along the broken line II—II of Fig. 1, Fig. 3 is a partial section similar to that of Fig. 2 of a modification, and Fig. 4 is a partial section taken through a sprocket having a single row of peripheral teeth and a pair of endless cords.

The chain driving mechanism illustrated in Fig. 1 comprises an endless chain 14 engaging sprockets 11, 12, and 13 of different diameters mounted at different distances from each other. An idle roller urged against the chain by a spring 15 serves to tauten the chain automatically.

For the purpose of dampening the noise produced incidentally to the engagement of the links of the chain 14 with the peripheries of the sprockets 11 and 12 I have provided an endless cord 16 of noise-absorbing material which engages the two sprockets 11 and 12 and is interposed between the peripheries of these sprockets and the links of the chain 14 constituting a seat for the links. The cord preferably consists of an elastomeric material, such as natural or synthetic rubber, or of a suitable elastomeric plastic such as polyurethane. The sprockets 11 and 12 are provided with peripheral grooves accommodating the endless cord 16.

Preferably each of the sprockets is provided with a pair of spaced peripheral rows of teeth flanking a groove having side walls 24 and 25 and a bottom wall on which the cord 16 is seated. In this event the chain preferably includes central links 19 disposed between the conventional lateral links and rollers 20 and 21 are mounted on the conventional pivot pins connecting the links. As shown in Fig. 2, the central links 19 of the chain 14 will seat on the outer surface of the cord 16 in a position in which the rollers 20 and 21 will be kept spaced from the bottoms 22 and 23 of the gaps between the teeth 17 and 18.

Preferably the cross-sectional profiles of the cord 16 and of the peripheral grooves of the sprockets 11 and 12 are so related as to afford the cord freedom for lateral expansion in response to radial compression. For this purpose a lateral clearance is preferably provided between the side walls 24 and 25 of the grooves and the lateral faces of the cord 16 as shown in Fig. 2 on an exaggerated scale.

In the embodiment of Fig. 3 the cross-sectional profile of the cord 16′ is composed of an inner rectangle of larger width and an adjoining outer rectangle of smaller width. The larger rectangle may closely fit the groove. In that event clearances 26 and 27 will be left on either side of the rectangle of smaller width. When the cord of resilient material is radially compressed by the links 19 seated thereon, the resilient material may laterally escape into the clearances 26 and 27. In this manner the impact of the links incidental to the engagement with the cord will be dampened and the noise will be effectively absorbed.

If desired, a metal core element may be embedded in the material of the cord. In Fig. 3 I have indicated such a metal core in form of a wire helix 28. This metal core will reinforce the endless cord and reduce the radial compression thereof.

In the embodiment shown in Fig. 4 each of the sprockets 11 and 12 is provided with a single row of peripheral teeth for engagement with a chain of conventional construction and a pair of grooves is cut in the peripheral faces of shoulders provided on either side of the row of teeth. A pair of endless cords 16″ of resilient material engages the sprockets 11 and 12 in the manner shown in Fig. 1.

Each of the cords 16″ has a cross-sectional profile including an outer straight line and an inner semi-circle. When each of the cords 16″ is in relaxed condition it will assume the position shown in Fig. 4. From this figure it will be noted that in the region of contact with the bottom of the groove the profile of the cord has a comparatively short radius of curvature, whereas the cross-sectional profile of the groove is straight or, in other words, has a radius of infinite length. Therefore, when the cord is compressed in radial direction, its material may escape into the clearance between the rectangular corners and the semi-circles of the cross-sectional profiles of the groove and of the cord. In Fig. 1 the two sprockets 11 and 12 are the sprockets of minimum distance from each other and the sprocket 11 is the sprocket of smallest diameter. By the provision of the cord 16 or 16', or the cord 16" respectively, the noise will be effectively absorbed, since the rollers 20 and 21 cannot abruptly engage the tooth gap bottoms 22 and 23, the radial pressure exerted by the chain upon the sprockets being taken up by the cord engaged by the links of the chain. Any oscillations of the chain links in the chain section extending between the sprockets 11 and 12 will be likewise effectively absorbed by engagement of these chain sections with the cord extending parallel thereto. These oscillations produced by the abrupt engagements of the links with the sprockets are one of the main sources of noise. If desired, the cord 16 may embrace the sprocket 13 too. No difficulties will be met in the assembly of the cord 16 in position within the grooves of the sprockets. This assembly may be achieved by bringing one of the sprockets into its final position only after the cord will have been inserted in the groove thereof.

Since the cord will mesh with the sprockets with a certain slippage, any wear that might occur will be evenly distributed over the entire length of the cord. In this manner it is avoided that the links of the chain will always engage the same points of the cord and indent the same by the hammering effect. This is a material advantage of my invention compared with the above-mentioned prior art arrangement in which each sprocket is provided with an individual annular strip of noise-absorbing material.

The absorption of noise is enhanced by the lateral clearance of the cord in the groove permitting the material of the cord to yield laterally as explained hereinabove with reference to Figs. 2, 3 and 4.

As the smaller sprockets will produce more noise than the larger sprockets, I prefer to include the sprocket of smallest diameter, such as sprocket 11 in Fig. 1, in the group of sprockets engaged by the cord.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Chain driving mechanism comprising a plurality of sprockets, an endless chain engaging said sprockets, and an endless cord of noise-absorbing material engaging at least two of said sprockets and being interposed between the peripheries of the latter and the links of said chain and constituting a seat for said links.

2. Mechanism as claimed in claim 1 in which said cord consists of an elastomeric material.

3. Mechanism as claimed in claim 2 in which a metal core element is embedded in said material.

4. Mechanism as claimed in claim 1 in which said sprockets are provided with peripheral grooves accommodating said endless cord.

5. Mechanism as claimed in claim 4 in which the cross-sectional profiles of said cord and of said grooves are so related as to afford the cord freedom for lateral expansion in response to radial compression.

6. Mechanism as claimed in claim 5 in which the cross-sectional profile of said cord is composed of an inner rectangle of larger width and an adjoining outer rectangle of smaller width.

7. Mechanism as claimed in claim 5 in which the profile of said cord, when the latter is in relaxed condition, in the region of contact with the bottom of said groove has a shorter radius of curvature than the cross-sectional profile of said groove has in said region.

8. Mechanism as claimed in claim 7 in which the cross-sectional profile of said groove is a rectangle, whereas the cross-sectional profile of said cord within said region is an arc of a circle.

9. Mechanism as claimed in claim 1 in which said sprockets have a pair of peripheral rows of teeth and a groove therebetween, said groove accommodating said cord and having a larger width than the width of said cord in relaxed condition.

10. Mechanism as claimed in claim 1 in which said sprockets have different diameters and in which the two of said sprockets engaged by said cord are the sprockets of minimum distance from each other and include the sprocket of smallest diameter.

11. A chain driving mechanism comprising a plurality of sprockets, an endless chain engaging the teeth of said sprockets, and an endless cord of noise-absorbing material engaging peripheral portions on at least two of said sprockets, said peripheral portions being disposed laterally of said teeth on said two of said sprockets, said cord being interposed between said peripheral portions and the links of said chain and constituting a seat for said links.

12. A chain driving mechanism according to claim 11, in which said peripheral portions are constituted by grooves and in which the respective cross-sectional profiles of said grooves and said cord are so related as to afford said cord freedom for expansion in response to radial compression.

References Cited in the file of this patent

UNITED STATES PATENTS

| | | |
|---|---|---|
| 556,663 | Dennison | Mar. 17, 1896 |
| 761,401 | Reynolds | May 31, 1904 |
| 975,938 | Downey | Nov. 15, 1910 |
| 2,492,219 | Haefeli | Dec. 27, 1949 |
| 2,534,679 | Place | Dec. 19, 1950 |
| 2,747,420 | Beck | May 29, 1956 |

FOREIGN PATENTS

| | | |
|---|---|---|
| 702,974 | Great Britain | Jan. 27, 1954 |
| 719,694 | Great Britain | Dec. 8, 1954 |